(12) United States Patent
Cermignani et al.

(10) Patent No.: US 6,236,353 B1
(45) Date of Patent: May 22, 2001

(54) FM MODULATION TECHNIQUE FOR PRODUCING FREQUENCY REJECTION BANDS

(75) Inventors: Justine D. Cermignani, Fort Salonga; Heinz H. Schreiber, Centerport, both of NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 07/196,579

(22) Filed: May 20, 1988

(51) Int. Cl.$^7$ .................................................. G01S 13/00
(52) U.S. Cl. ................................. 342/201; 342/159
(58) Field of Search .............................. 342/159, 192, 342/196, 201

(56) References Cited

U.S. PATENT DOCUMENTS

| | | |
|---|---|---|
| 3,114,148 | 12/1963 | Lederman . |
| 3,140,489 | 7/1964 | Downie . |
| 3,263,227 | 7/1966 | Ferry et al. . |
| 3,299,427 | 1/1967 | Kondo . |
| 3,344,426 | 9/1967 | Long . |
| 3,374,480 | 3/1968 | Russell et al. . |
| 3,896,434 | * 7/1975 | Sirven .................................. 342/192 |
| 3,945,012 | * 3/1976 | Cooper ................................ 342/159 |
| 3,992,709 | 11/1976 | Watanabe et al. . |
| 4,053,889 | 10/1977 | Johnson . |
| 4,161,732 | * 7/1979 | Longuemare, Jr. .................. 342/201 |
| 4,200,872 | 4/1980 | Sifferlen et al. . |
| 4,359,736 | 11/1982 | Lewis . |
| 4,427,982 | * 1/1984 | Caprio ................................. 342/159 |
| 4,622,552 | * 11/1986 | Andrews et al. .................... 342/196 |
| 4,622,555 | * 11/1986 | Doggett et al. ...................... 342/159 |
| 4,709,237 | * 11/1987 | Poullain et al. ..................... 342/192 |
| 4,743,910 | * 5/1988 | Hill et al. ............................. 342/159 |

* cited by examiner

Primary Examiner—Mark Hellner
(74) Attorney, Agent, or Firm—Terry J. Anderson; Karl J. Hoch, Jr.

(57) ABSTRACT

Presented in this invention is a technique for producing a null in the frequency spectrum of an FM signal pulse, the null matching an interference that has been superposed on the signal pulse. By matching the null to the interference, the energy in the frequency spectrum is shifted in such a way that when the interference is rejected by a band elimination filter, none of the useful energy would be discarded along with the rejected interference. Consequently, a signal resulting from the technique has a much higher amplitude than previously filtered signals. This leads to the signal being more readily recognized by detection systems, such as a radar detector.

11 Claims, 7 Drawing Sheets

FM MODULATION TECHNIQUE FOR PRODUCING FREQUENCY REJECTION BANDS

FIELD OF THE INVENTION

The present invention relates to modulation techniques and more particularly to a technique for forming a null at virtually any desired frequency within the spectrum of a transmitted FM signal pulse for eliminating therefrom noises or interferences on reception which, if not eliminated, would decrease the energy level of the signal pulse.

CROSS REFERENCES TO RELATED APPLICATIONS

This invention is related to copending application entitled METHOD AND APPARATUS FOR SUPPRESSING NARROW BAND INTERFERENCE FOR A PULSE COMPRESSION RADAR SYSTEM by the same inventors and assigned to the same assignee as the instant invention, filed on May 20, 1988.

BACKGROUND OF THE INVENTION

It is well known by an artisan in the radar waveform design art that increased radar target resolution can be achieved by transmitting a linearly or non-linearly stepped FM signal pulse (toward a target) and processing its received echo by passing it through a network which processes linear (or non-linear) delay characteristics, with respect to frequency, so as to compress the received energy into a narrow high amplitude time pulse. Environments do exist, however, for radar operation wherein narrow bandwidth interference sources are active at frequencies within the same bandwidth as that of the stepped FM pulse. These interferences are received with the desired echo, generally at much larger amplitudes than the echo. Thus, when a combination of the received interference(s) and desired signal is processed by the linear delay network, the resulting compressed time pulse may become distorted, so much so as to become unrecognizable and therefore undetectable, due to the interferences.

To correct this problem, a current method involves the implementation of a narrow band elimination filter in the radar receiver prior to pulse recompression so that the unwanted interference frequencies are eliminated prior to passing the received echo through the linear delay network. Less perturbation to the ideal echo results and the received compressed pulse is restored to a shape which at least is detectable, rather than being totally unrecognizable.

Yet the use of band elimination filter in the frequency spectrum of the stepped FM pulse also results in the removal of energy from the desired signal. This leads to an intolerable decrease in the amplitude of the desired echo, thereby leading to a situation where the radar receiver often fails to detect these weak echoes.

SUMMARY OF THE INVENTION

The present invention technique utilizes non-linear frequency modulation of the transmitted stepped FM pulses so that controlled frequency elimination bands will be inherently present in the FM pulse signal spectrum. Consequently, the use of band elimination filters in the radar receiver to remove interference superposed on the FM pulses would not remove energy from the desired signal echo and, therefore, the available received signal power would not be decreased.

To achieve this end, a natural null is produced in the frequency spectrum of the of interest signal pulse at the frequency at which rejection is to take place. By thus providing a null at that frequency, the remaining energy of the signal pulse would then be redistributed to the remaining areas of the signal spectrum so that when the signal spectrum is filtered by a band elimination filter, only the interference, and not the energy ordinarily associated therewith, would be eliminated from the spectrum, since the interference is located in the null position of the signal spectrum. As a consequence, all available energy for the desired echo remain intact and the echo can easily be detected by a radar receiver.

It is thus an objective of the present invention to provide for a technique which would produce a null in the frequency spectrum of a FM signal for matching an interference superposed thereon before the same is to be rejected by a band elimination filter.

It is another objective of the present invention to provide for a frequency spectrum of a signal pulse which would retain its energy, despite the filtering of interference superposed thereon.

It is yet another objective of the present invention technique to provide for a frequency spectrum of a signal pulse which results in a desired echo signal that is both recognizable and easily detected by a conventional radar receiver.

The above-mentioned objects and advantages of the present invention will become more apparent and the invention itself will be best understood by reference to the following description of an embodiment of the invention taken in conjunction with the accompanying drawings:

DETAILED DESCRIPTION OF THE INVENTION

Figure 1A:
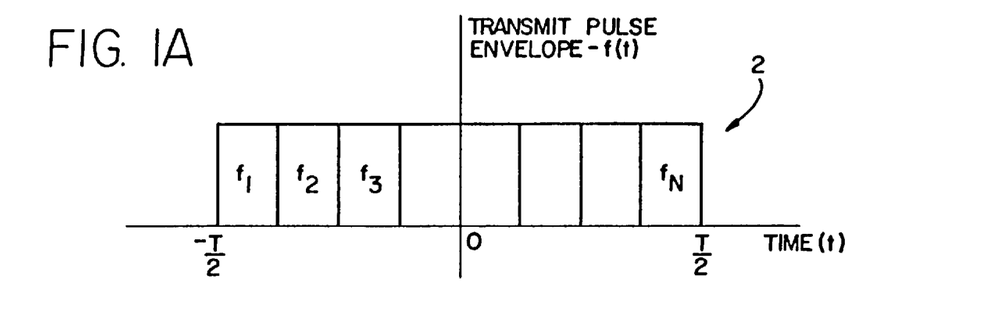
FIG. 1A is an illustration of an FM signal pulse divided into a number of different frequencies.
Figure 1B:
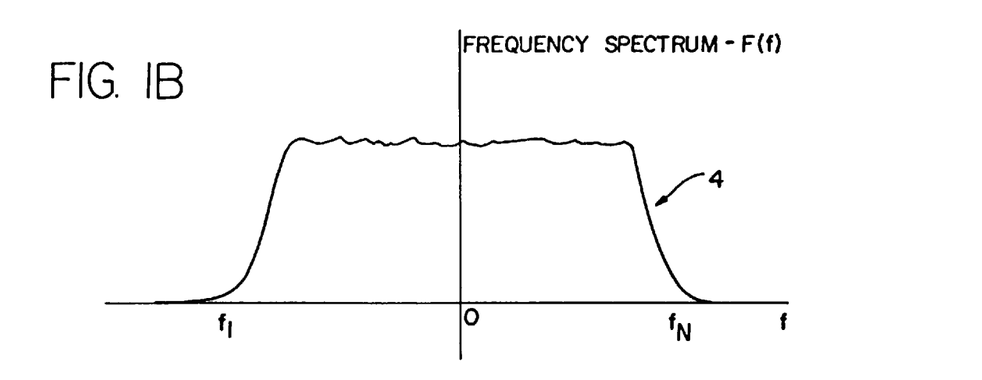
FIG. 1B is the frequency spectrum of the FIG. 1A signal pulse.
Figure 1C:
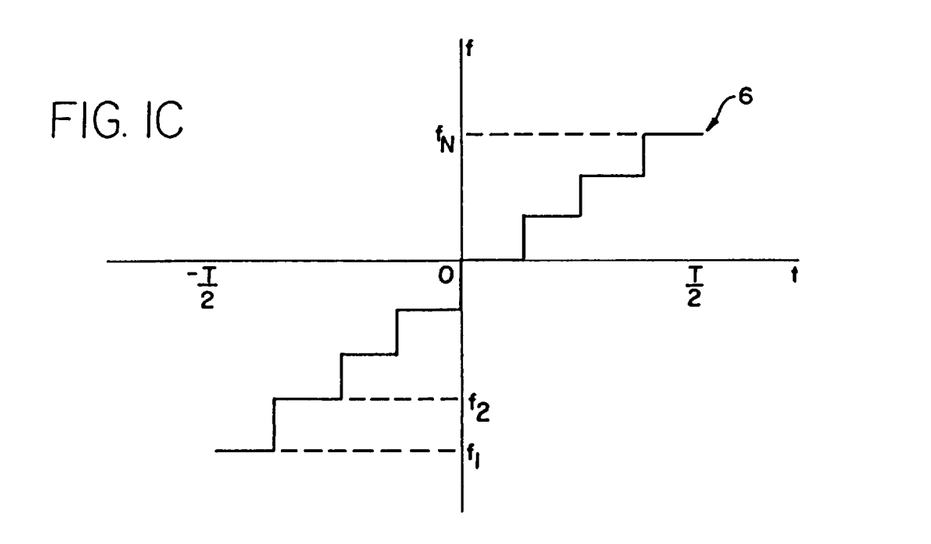
FIG. 1C is a step function illustration of the frequencies of the FIG. 1A signal pulse.

A non-linear stepped FM signal pulse is illustrated in FIG. 1A. As shown, pulse 2 is divided into a number of steps, each having its own frequency, such as $F_1, F_2, F_3 \ldots$ to $F_N$. A sinusoidal wave, which is phase continuous from step to step, is produced. But as it goes from one step to the next, it has a different frequency. And a frequency spectrum representative of signal 2, i.e. a Fourier transform of signal 2, is shown in FIG. 1B. The manner in which the frequency spectrum of FIG. 1B is generated is shown in FIG. 1C, as a function of different steps 6.

Figure 2:
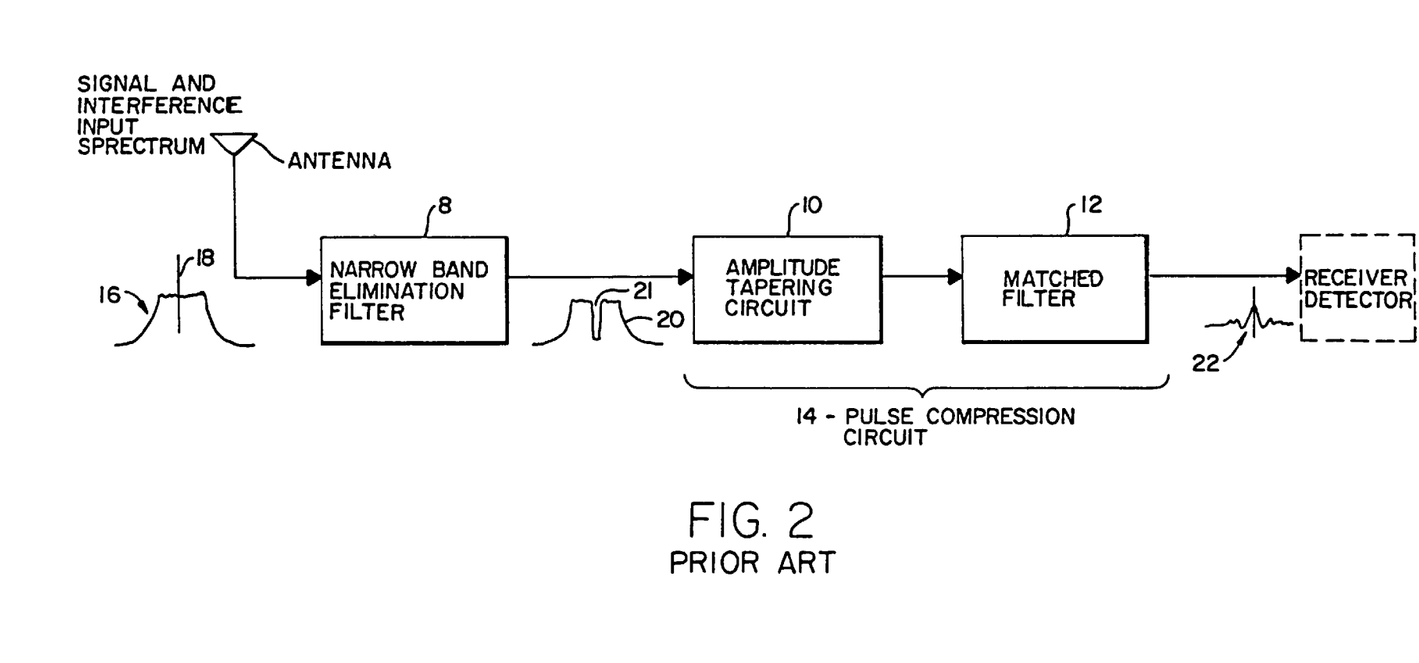
FIG. 2 is a block diagram of a conventional FM pulse receiver system.

Consider now the simplified block diagrams of the essential components of a conventional receiver system. As shown, a narrow band elimination filter 8 is connected to an amplitude tapering circuit 10, which in turn is connected to a matched filter 12 whose output is transmitted to a receiver detector circuit. The operation of this system is described hereinbelow.

Via the antenna, a signal which has interference superposed thereon is received. For the sake of simplicity, only one interference is assumed to have been superposed on the signal. This interference may, for example, be due to a communications emitter in the environment. As shown, the frequency spectrum of the signal, designated 16, has superposed thereon a narrow band interference, or noise, 18. As this frequency spectrum passes through filter 8, the interference is eliminated and a frequency spectrum, designated 20, results. It should be appreciated that the location of the notch, i.e. the elimination band, of filter 8 for eliminating the interference had previously been determined by means of a device such as a conventional spectrum analyzer, an environmental evaluator or a channel monitor. Thus, the occurrence of an interference had already been identified and its location, with respect to the frequency spectrum, had been known. Accordingly, the notch for filter 8, both in terms of its placement with respect to the frequency spectrum and its size, had already been preset. Of course, all of this is well known and has been taken into account in regard to the discussion of the FIG. 2 system.

Returning to frequency spectrum 20, it can be seen that since interference 18 has been filtered therefrom, the energy level of spectrum 20, i.e., the area under spectrum 20, is less than that of frequency spectrum 16. This frequency spectrum is next passed through the amplitude tapering circuit 10 whereby the side lobes of the received signal are reduced. And with matched filter 12 completing pulse compression circuit 14, the frequency spectrum is converted back to a signal in the time domain, designated 22. It can be seen that signal 22 is a clean signal representative of the input signal. Difficultly does arise, however, in that the amplitude of signal 22 has been degraded substantially, oftentimes to such an extent that it could not be recognized by a receiver detector, such as that for a radar receiver. This, of course, is due to the fact that in rejecting interference 18 from frequency spectrum 16, a substantial amount of energy is also eliminated from the signal frequency spectrum: to wit, the notched portion 21 of frequency spectrum 20 outputted from filter 8. In essence, useful signal energy is wasted in rejecting the interferences.

Figure 3A:
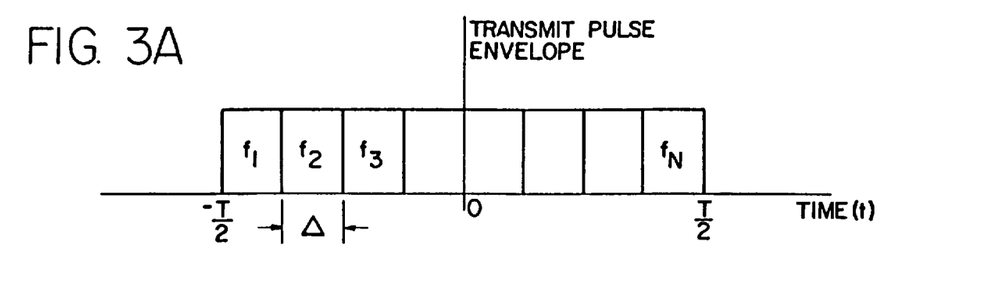
FIG. 3A is an illustration of a signal pulse with different frequencies.
Figure 3B:
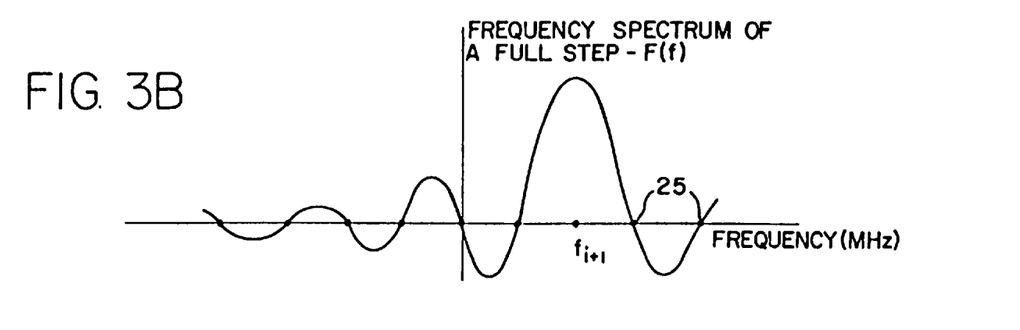
FIG. 3B is a Fourier transform of a contribution term for one of the frequencies of the FIG. 3A signal pulse.

The technique of generating a frequency spectrum which would allow the elimination of interference therefrom and yet still permits the retention of all the energy thereof is shown in FIGS. 3A to 3F. Starting with FIG. 3A, a signal pulse which has frequencies $F_1$ to $F_N$ is illustrated, with the (time) width of each step or portion of the signal pulse represented by $\Delta$. A Fourier transform of one of the frequencies of the signal pulse is shown in FIG. 3B. It should be noted that the dimensions of FIG. 3A and FIG. 3B are not meant to correspond, as the frequency spectrum of FIG. 3B has been drawn with an eye to accentuate the waveform of the frequency spectrum.

Assuming an interference is to be superposed on the FIG. 3A signal at its center, the present invention technique proposes to create an artificial null, or a notch, at the same location so as to match the interference. By so doing, the energy which otherwise would have been removed along with the interference by a filter is shifted to different parts of the frequency spectrum. Consequently, no energy is wasted in rejecting the interference and a compressed signal having a much higher amplitude than that of the prior art results.

Figure 3C:
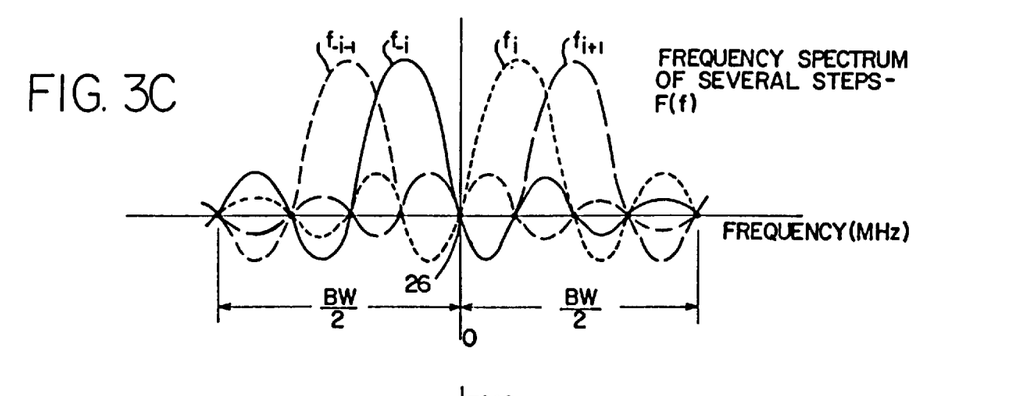
FIG. 3C shows a combination of Fourier transforms of a number of contribution terms for the FIG. 3A signal pulse.
Figure 3D:
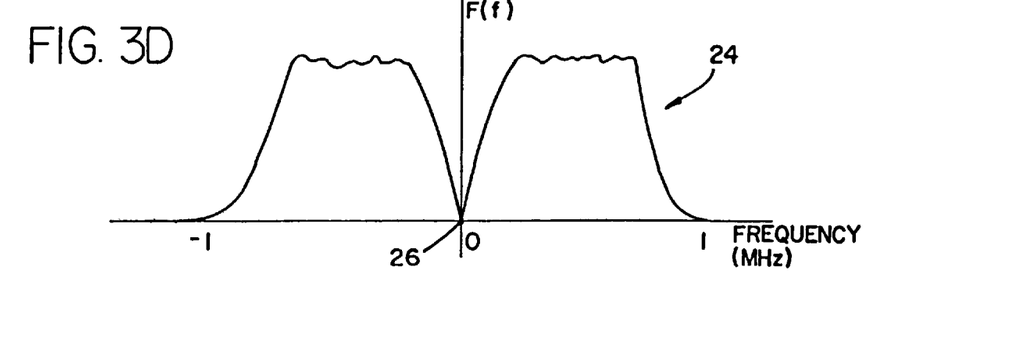
FIG. 3D is a summed frequency spectrum of the FIG. 3A signal pulse having a null located at a particular location thereof.
Figure 3E:
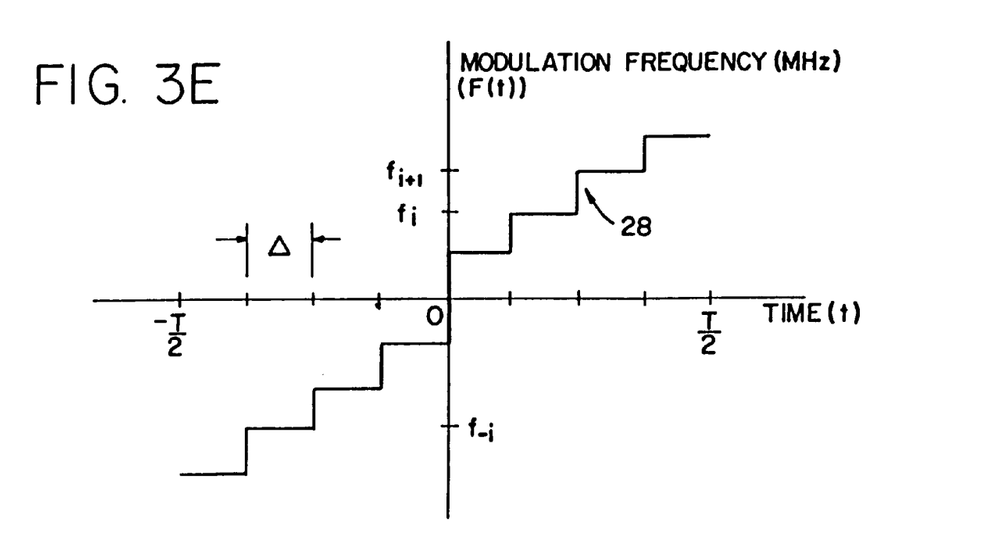
FIG. 3E is a step function frequency diagram of the FIG. 3A FM signal pulse.

To accomplish this end, referring to FIGS. 3C to 3E, since the relationship between f(t) and F(f)—between a signal and its Fourier transform—is well known, using the fact that the signal is divided into different steps, the present invention technique proposes to Fourier transform each step of the signal as shown in FIG. 3C. As a result of the superpositioning of each transformed step, for example designated by $f_{-i-1}, f_{-i}, f_i$ and $f_{i+1}$, the frequency transform of the FIG. 3A signal eventually will end up looking like frequency spectrum 24 of FIG. 3D. It should be appreciated that the bandwidth of the signal, and naturally its frequency spectrum counterpart, had previously been selected. Assuming each step has a width $\Delta$, the step would be proportional to the following equation:

$$\frac{\sin[\pi\Delta(f - f_i)]}{\pi\Delta(f - f_i)} \quad (1)$$

This equation represents a contribution term or a spectral contribution for each step of frequency spectrum 24. It follows then that when all the spectral contributions are added, the following equation $$\sum_{i=1}^{N} \frac{\sin[\pi\Delta(f - f_i)]}{\pi\Delta(f - f_i)} \text{ results.} \quad (2)$$

As was discussed previously, each contribution term would look like the waveform shown in FIG. 3B, with nulls, designated 25, at well known frequencies. Also, as is readily apparent, the peak of each contribution is at $f_i$ (although shown as $f_{i+1}$ in FIG. 3B). It should further be appreciated that nulls 25 are at well defined positions relative to $f_i$. In fact, each null, represented as $f_{null}$, has the following equation $$f_{null} = f_i \pm \frac{n\pi}{\Delta} \quad (3)$$

where n=1, 2, 3 . . . .

This equation defines where the null for the Fourier transform (or spectral contribution) for each step or portion of the signal are located.

Returning to FIG. 3C, since it was desired to put the null at the center of the signal, having already decided what the bandwidth of the signal is, the respective frequency spectrums of the different steps are positioned to either side of the null position, with a null in each of the frequency spectrums being coincident at the center null, otherwise known as the main null. As shown in FIG. 3C, on each side of this main null 26, the frequency spectrums for the different contributing terms are placed. In other words, as shown in FIG. 3C, on the right side of null 26 are spectrums $f_i$ and $f_{i+1}$; while on the left hand side of null 26 are frequency spectrums $f_{-i}$ and $f_{-i-1}$. Of course, the number of steps or portions is dependent on the bandwidth and the number of steps in which the incoming signal has been divided. Insofar as the of interest null is located at the center of the frequency spectrum for the example shown in FIG. 3C, the resulting frequency spectrum 24, shown in FIG. 3D, becomes symmetrical, with half of the bandwidth of the signal being at equal distance away from the center, i.e. the null point.

Of interest to note is that each frequency spectrum for the respective steps has to have exactly one of its nulls coincident to main null 26. Also of import to note is that even though only one main null is shown in FIGS. 3C and 3D, a plurality of main nulls, corresponding to a plurality of interferences, may also be effected. To achieve the plurality of main nulls, it is only necessary to determine where the interferences would be, with relation to the different steps of the signal, so that different main nulls may be designated, with the respective frequency spectrums of the steps being shifted away from these main nulls. Thus, all of the energy of the signal spectrum has been shifted in such a way that none of it will be discarded or eliminated when the interference which is superposed on the frequency spectrum is rejected by a filter. A diagram of a frequency spectrum having two nulls according to the present invention is shown in FIG. 5 while an actual signal pulse synthesized for matching one interference occurring at an off-center frequency within the bandwidth of the spectrum is shown in FIG. 6.

Figure 4:
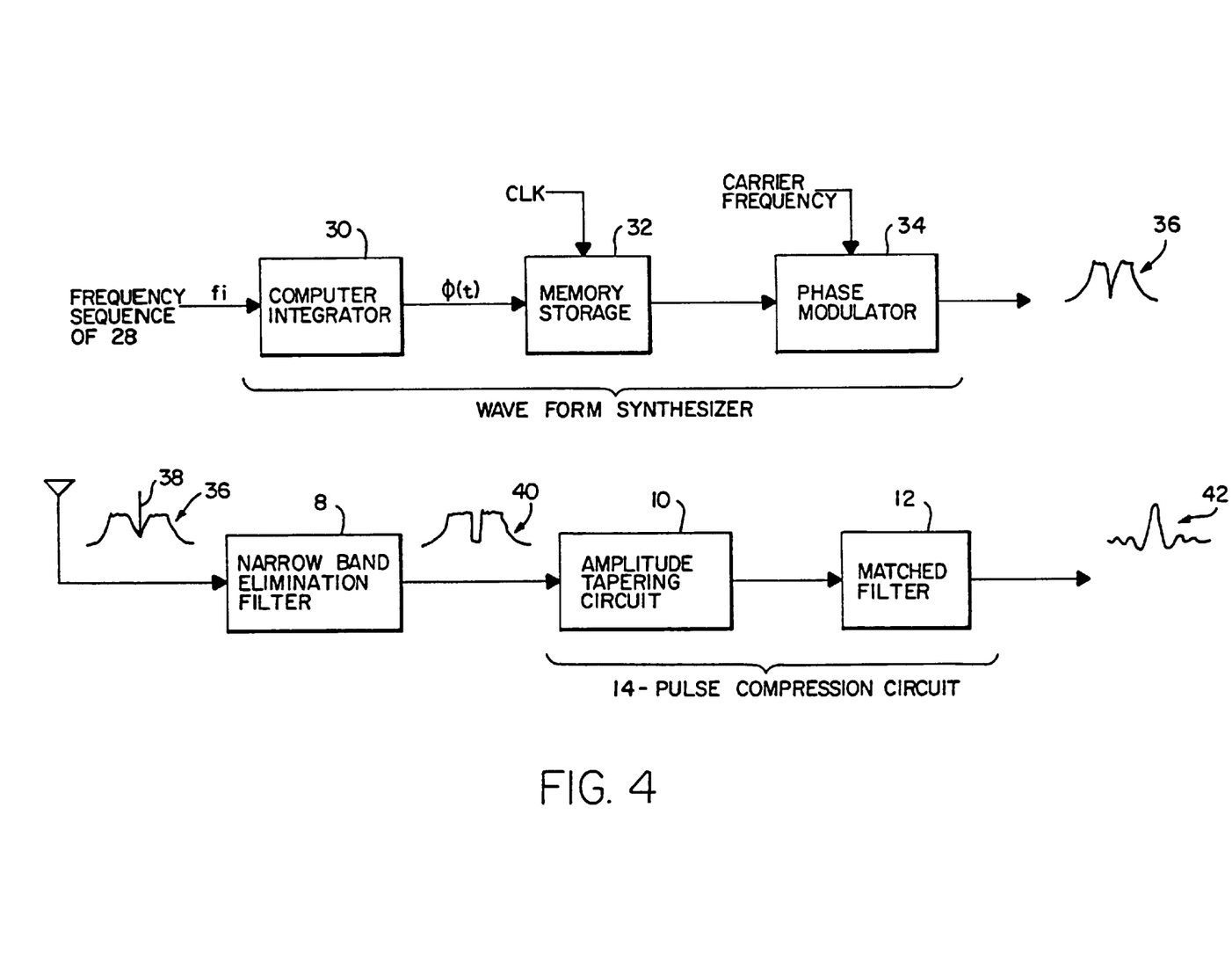
FIG. 4 is a system in simplified block diagram format showing the different components used for generating the frequency spectrum of FIG. 3D.
Figure 5:
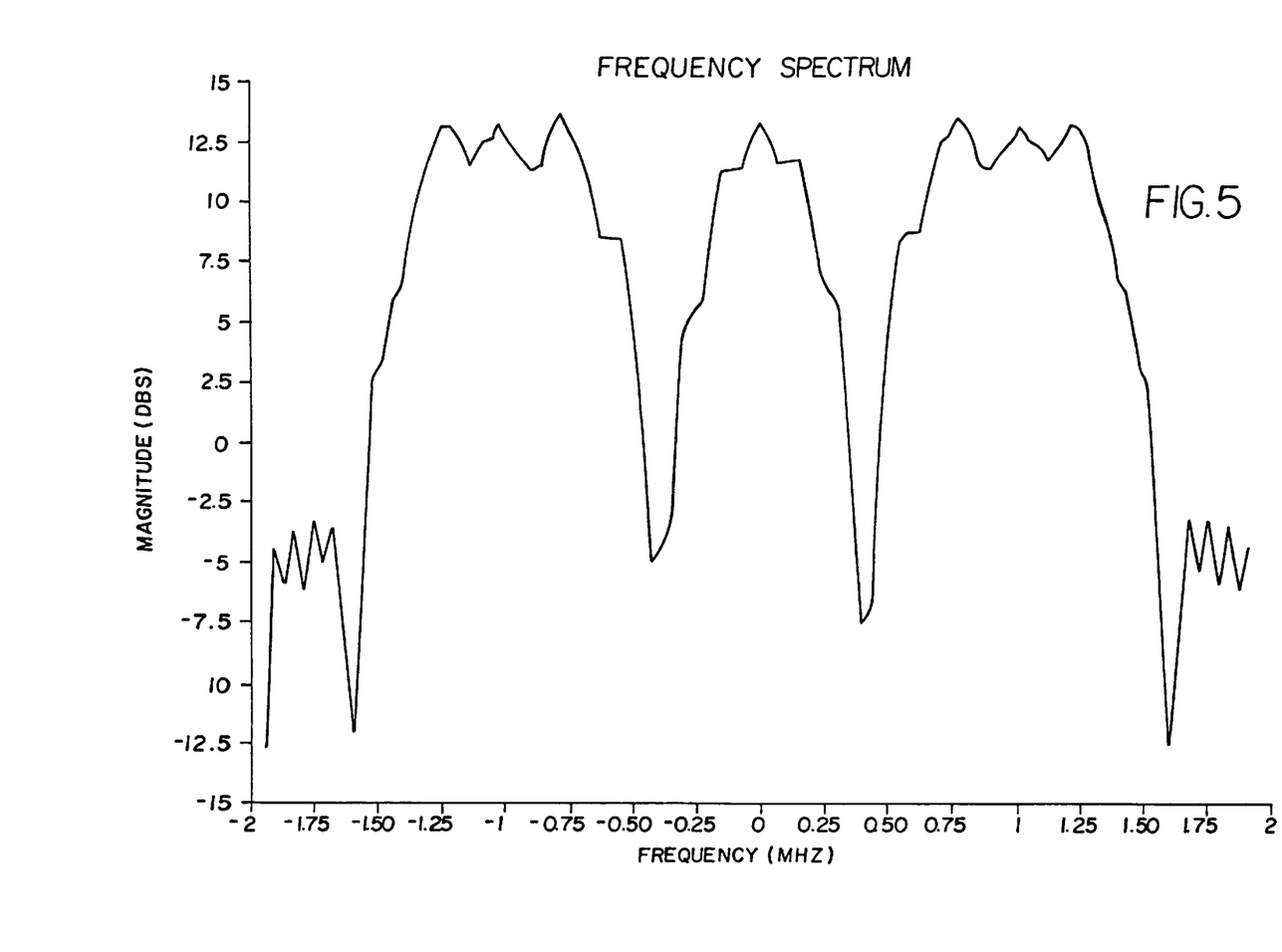
FIG. 5 is a frequency spectrum of a signal pulse showing two frequency notches for matching two interferences.
Figure 6:
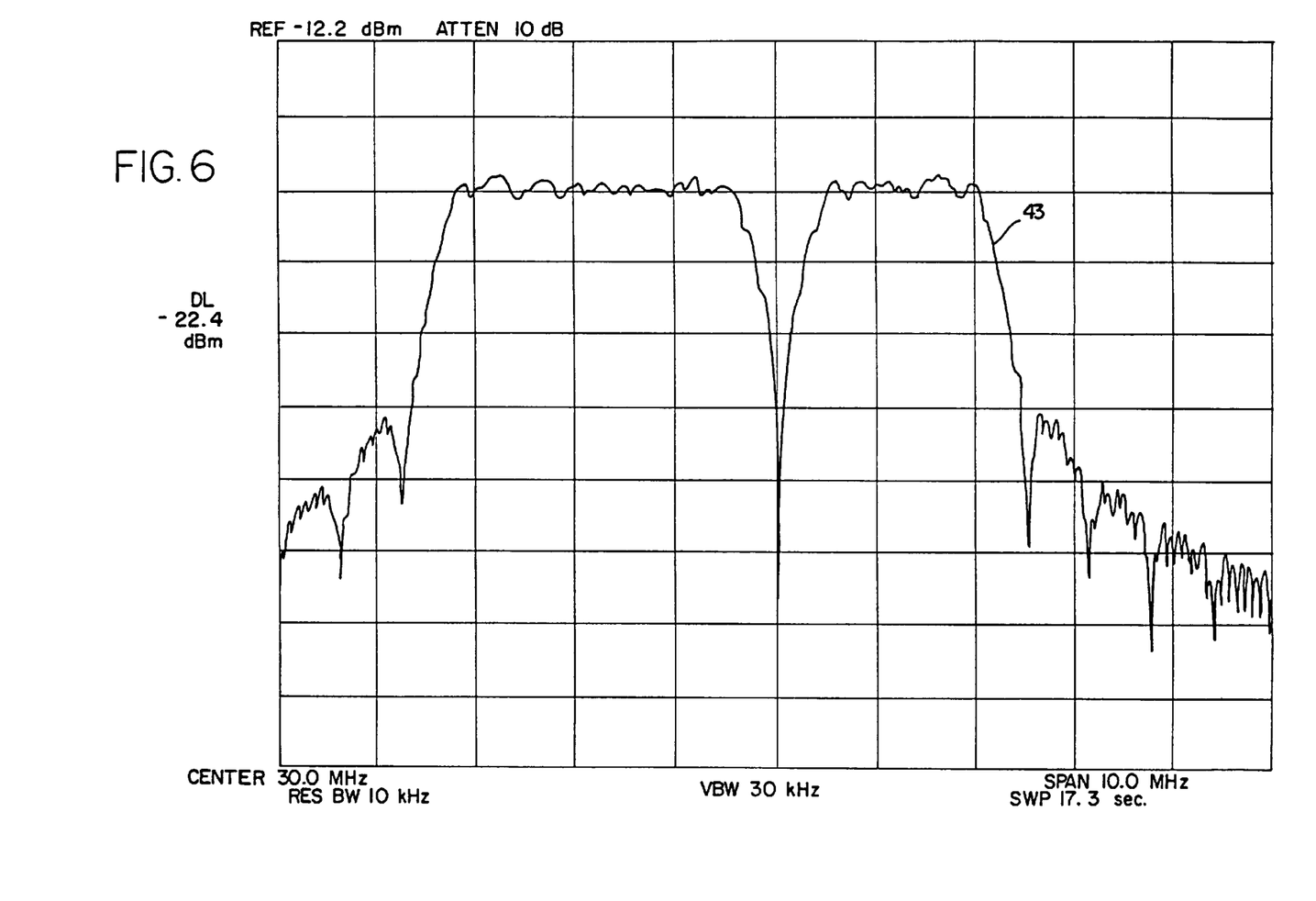
FIG. 6 is a frequency spectrum of an actual signal pulse which has been synthesized using this invention for matching one interference occurring at an off-center frequency within the bandwidth of spectrum.

FIG. 4 shows in simplified block diagram form the hardware needed for generating a signal with the frequency spectrum of FIGS. 3D, 5 or FIG. 6. As shown, a signal frequency sequence (e.g. 28) is fed to a computer integrator 30. There the signal is phase shifted according the formula $$\Phi(t) = 2\pi \int_{-T/2}^{T} f(t) dt. \quad (4)$$

Figure 3F:
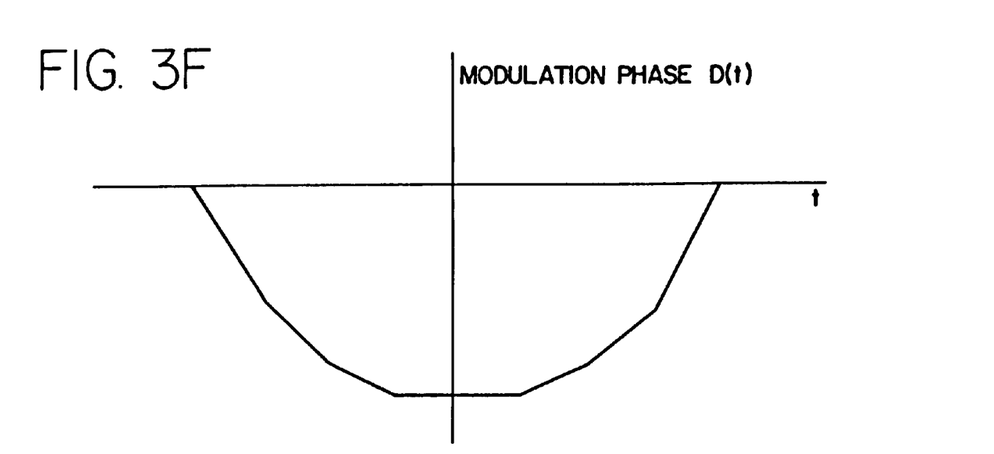
FIG. 3F is a piecewise linear phase function diagram of the FIG. 3E step function diagram showing the continuous phase of the transmitted pulse.

The thus converted function is shown in FIG. 3F and each point thereof is stored in a memory storage 32. The stored information is then sequentially fed to a phase modulator 34, which has a carrier frequency also inputted thereto. The computer integrator 30, memory storage 32 and phase modulator 34 are conventional devices which, for example, are made as a waveform synthesizer by the Hewlett Packard Company of Palo Alto, Calif. and the LeCroy Company of Spring Valley, N.Y.

The output frequency spectrum from phase modulator 34 is illustrated as spectrum 36. It should be noted that an interference 38 has been superposed on frequency spectrum 36, at the center thereof. As was discussed earlier with respect to the system in FIG. 2, when waveform 36 is fed to a receiver system, the narrow band elimination filter 8 would set a notch at the area of the frequency spectrum where interference 38 was deemed to be located. The resulting frequency spectrum, sans interference 38, is shown as spectrum 40. And as was discussed previously with respect to the FIG. 2 prior art system, this waveform 40 would traverse through different components and eventually would be outputted as an output signal, in this instance 42. Note, however, that since frequency spectrum 36 has a main null that matches interference 38, none of its energy has been rejected by filter 8. Consequently, signal 42 outputted from the system would have an amplitude much higher than that of signal 22 (shown in FIG. 2), assuming that frequency spectrum 16 (of FIG. 2) had had the same energy as frequency spectrum 36.

Thus, the present invention technique resides in the recognition that the different frequency spectrums of the different portions (or steps) of an incoming signal can be superposed over each other, with appropriate shifting, such that at least one null of each of the frequency spectrums may be coincident to the area where an interference is located. Insofar as filter 8, circuits 10 and 14 and matched filter 12 are well known and have been discussed previously, nothing more needs to be said in regard to those components. It should be appreciated that integrator 30, storage 32 and modulator 34 can be combined into one single frequency synthesizer so that the portions of the signal can be sequentially transmitted therefrom.

Inasmuch as the present invention is subject to many variations, modifications and changes in detail, it is intended that all matter described throughout this specification and shown in the accompanying drawings be interpreted as illustrative and not in a limiting sense. Accordingly, it is intended that the invention be limited only by the spirit and scope of the appended claims.

What is claimed is:

1. A method of producing a signal pulse immune to interference due to noise, the method comprising the steps of:

determining the duration of a signal pulse;

dividing the pulse duration of the signal pulse into a number of equal portions, each portion having a corresponding frequency;

transforming the respective frequencies of the portions to corresponding frequency spectrums, each frequency spectrum having a multiple number of nulls;

locating the whereabouts of the noise on the signal pulse;

designating the noise location as an of interest point on the signal pulse;

summing the frequency spectrums, a null in each of the frequency spectrums being positioned coincident at the of interest point;

thereby generating a summed frequency spectrum for the signal pulse which has a main null at the of interest point, the main null matching the noise carried on the signal pulse.

2. The method according to claim 1, further comprising the step of:

passing the summed frequency spectrum having the matching main null and noise to a filter for rejecting the noise on the summed frequency spectrum;

wherein, since the noise is located at and matched by the main null, the summed noise-rejected frequency spectrum has an energy level approximately identical to the summed frequency spectrum before the noise rejection.

3. The method according to claim 2, further comprising the step of:

compressing the noise rejected frequency spectrum so as to transform the same into a compressed signal pulse having approximately the same energy level as the summed frequency spectrum before the noise rejection; whereby the compressed signal pulse has available signal power, to be received by a receive means, which has not been decreased by the filter.

4. The method according to claim 1, wherein the transforming step comprises the step of:

Fourier transforming each portion according to the formula $$\frac{\sin[\pi\Delta(f - f_i)]}{\pi\Delta(f - f_i)}$$

where
- f=frequency of the portion under consideration;
- Δ=width of the portion;
- $f_i$=frequency at which the peak of the spectrum for the portion is located.

5. The method according to claim 4, wherein the summation step comprises the step of:

summing the respective Fourier transforms of the portions according to the formula $$\sum_{i=1}^{N} \frac{\sin[\pi\Delta(f - f_i)]}{\pi\Delta(f - f_i)}$$

where Σ=summation sign
- f=frequency of the portion under consideration
- Δ=width of the portion;
- $f_i$=frequency at which the peak of the spectrum for the portion is located.

6. The method according to claim 1, further comprising the step of:

defining for the frequency spectrum of each portion a plurality of null positions according to the formula $$f_{null} = f_i \pm \frac{n\pi}{\Delta}$$

where
- $f_{null}$=null positions for the portion;
- $f_i$=frequency at which the peak of the spectrum for the portion is located;
- Δ=width of the portion; and selecting for each frequency spectrum one of the plurality of the defined null positions for placement of the interest point.

7. In a system for receiving signal pulses some of which having interferences superposed thereon, a method of eliminating the interferences by producing at least one signal pulse having at least one null for cancelling each of the interferences, the method comprising the steps of:

selecting a bandwidth for the signal pulse; the signal pulse having at least one interference superposed thereon;

separating the bandwidth into a predetermined number of steps, each step having its own frequency;

determining equal width values for the steps by dividing the bandwidth with the predetermined number;

designating the location of the interference on the signal pulse as a point of interest;

Fourier transforming the respective steps;

summing the respective Fourier transforms of the steps such that a null for each of the transforms is coincident at the point of interest, the summed transforms producing a signal spectrum for the signal pulse having a main null at the point of interest, the main null matching the interference on the signal pulse.

8. The method according to claim 7, further comprising the step of:

passing the signal spectrum to a filter for filtering the interference on the signal spectrum at the point of interest;

wherein, insofar as the interference is located at the main null, the filtered signal spectrum maintains an energy level unaffected by the filter.

9. The method according to claim 8, further comprising the step of:

compressing the filtered signal spectrum in order to form a corresponding compressed signal pulse for detection by a receiver means, the compressed signal having an amplitude corresponding to the energy level of the filtered signal spectrum.

10. The method according to claim 7, wherein the Fourier transforming step comprises the step of:

proportioning each respective step according to the equation $$\frac{\sin[\pi\Delta(f - f_i)]}{\pi\Delta(f - f_i)}$$

where
- f=frequency of the step
- Δ=width of the step;
- $f_i$=frequency at which the peak of the spectrum for the portion is located.

11. The method according to claim 7, further comprising the step of:

defining for each Fourier transform of the steps a plurality of null position according to the equation $$f_{null} = f_i \pm \frac{n\pi}{\Delta}$$

where
- $f_{null}$=null positions for the Fourier transform of the step;
- $f_i$=frequency at which the peak of the spectrum for the portion is located;
- Δ=width of the step; and selecting for each Fourier transform one of the plurality of the defined null positions for coincidental placement at the point of interest.

* * * * *